(12) United States Patent
Kim et al.

(10) Patent No.: US 7,394,444 B2
(45) Date of Patent: Jul. 1, 2008

(54) LED DRIVER

(75) Inventors: Nam-in Kim, Suwon-si (KR); Jeong-il Kang, Yongin-si (KR); Joon-hyun Yang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/262,807

(22) Filed: Nov. 1, 2005

(65) Prior Publication Data

US 2006/0181485 A1 Aug. 17, 2006

(30) Foreign Application Priority Data

Feb. 15, 2005 (KR) ................. 10-2005-0012410

(51) Int. Cl.
*G09G 3/36* (2006.01)

(52) U.S. Cl. .......................................... 345/87

(58) Field of Classification Search ................. 315/323, 315/312, 185 S, 200 A, 291; 362/800, 801, 362/806; 345/204, 50–51, 84, 87
See application file for complete search history.

(56) References Cited

U.S. PATENT DOCUMENTS

| | | | | |
|---|---|---|---|---|
| 4,504,776 | A * | 3/1985 | Haville ........................ 323/288 |
| 6,400,101 | B1 * | 6/2002 | Biebl et al. .................. 315/291 |
| 6,825,619 | B2 * | 11/2004 | Norris ........................ 315/149 |
| 6,897,623 | B2 * | 5/2005 | Yoneda et al. ............... 315/291 |
| 6,952,334 | B2 * | 10/2005 | Ball et al. ................... 361/93.9 |
| 6,980,181 | B2 * | 12/2005 | Sudo ........................... 345/82 |
| 7,075,250 | B2 * | 7/2006 | Colwell ....................... 315/291 |
| 7,091,705 | B2 * | 8/2006 | Hoshino et al. ............. 323/222 |
| 7,119,498 | B2 * | 10/2006 | Baldwin et al. ............. 315/291 |
| 7,129,914 | B2 * | 10/2006 | Knapp et al. ................. 345/76 |
| 7,135,825 | B2 * | 11/2006 | Tanabe ........................ 315/308 |
| 2004/0196225 | A1 | 10/2004 | Shimada | |

FOREIGN PATENT DOCUMENTS

| | | |
|---|---|---|
| CN | 1370035 | 9/2002 |
| CN | 1484213 | 3/2004 |
| JP | 2001-76525 | 3/2001 |
| JP | 2002-244619 | 8/2002 |
| JP | 2004-93761 | 3/2004 |
| JP | 2004-133312 | 4/2004 |
| JP | 2004-157225 | 6/2004 |

\* cited by examiner

*Primary Examiner*—Douglas W. Owens
*Assistant Examiner*—Minh Dieu A
(74) *Attorney, Agent, or Firm*—Roylance, Abrams, Berdo & Goodman LLP

(57) ABSTRACT

The present invention relates to an LED driver for driving light emitting diodes. The LED driver comprises a linear mode driver to increase and decrease a linear mode current to make a current flow in the LED at a predetermined target current value and output it to the LED; and a switch mode driver to increase and decrease a switch mode current depending on whether the linear mode current exceeds a predetermined reference current value and output it to the LED. Thus, the present invention provides an LED driver having high power efficiency and light efficiency and minimal distortions of a driving current.

12 Claims, 6 Drawing Sheets

LED DRIVER

CROSS-REFERENCE TO RELATED APPLICATIONS

This application claims the benefit under 35 U.S.C. §119(a) of Korean Patent Application No. 2005-0012410, filed on Feb. 15, 2005, in the Korean Intellectual Property Office, the entire disclosure of which is hereby incorporated by reference.

BACKGROUND OF THE INVENTION

1. Field of the Invention

The present invention relates to an LED driver. More particularly, the present invention relates to an LED driver, which provides improved power efficiency and light efficiency, and generates a drive current without distortion.

2. Description of the Related Art

Light emitting diodes (LEDs) are used as a light source of a liquid crystal display (LCD) apparatus, as well as a digital micromirror device (DMD) display apparatus such as a digital light processing (DLP) projection TV, a projector, and the like using a digital micromirror device (DMD).

FIG. 1 illustrates the DMD display apparatus which employs LEDs as the light source. The DMD display apparatus employs a plurality of LED. modules 210 corresponding to respective red, green and blue colors of and RGB signal.

The LED modules 210 are driven by an LED driver 200, and emit light signals of red, green and blue to sequentially project them to a DMD module 230 through a lens 220. A large number (hundreds of thousands or millions) of mirrors 240 are integrated in the DMD module 230 by a micro electromechanical systems (MEMS) process, and independently turn on/off. Accordingly, RGB color signals projected to the DMD module 230 form a predetermined picture on a screen 250.

LEDs have several advantages over conventional discharge lamps and the like. Referring to a wave form 254 illustrated in FIG. 2, the DMD display apparatus using LEDs as the light source has high usability of the light source as compared with a moving wave form 252 of a conventional display apparatus using a discharging lamp as the light source. Thus, the DMD display apparatus has high light efficiency. LEDs also have a longer life span than the discharging lamp, and a display apparatus that employs LEDs as a light source advantageously has a semi permanent life span since it does not require a mechanical apparatus such as a color wheel.

The LED driver 200 for driving the LED modules 210 typically comprises a circuit configuration as shown in FIG. 3. The LED driver 200 in FIG. 3 may be referred to as a linear mode driving circuit. The LED driver 200 comprises a current detector to detect a current flowing in the LED modules 210; an error amplifier 262 to compare a voltage corresponding to a detected current value and a reference voltage Vref and output an error signal; and an output transistor 264 to increase/decrease a current Io flowing in the LED modules 210 according to the error signal.

The LED driver 200 in FIG. 3 detects the current Io flowing in the LED modules 210, compares the voltage corresponding to the detected current value and the reference voltage Vref, and adjusts the current Io flowing in the LED modules 210 until the two voltages are identical so that a current corresponds to the reference voltage Vref set up in the LED modules 210. In this manner, the amount of current delivered to the different colored LEDs can vary according to their color.

As the amount of light for each of the RGB colors is different in white light, the value of the current Io flowing in the LED modules 210 is different for each of the red, green and blue colors, and it is adjusted through the reference voltage Vref.

The LED driver 200 in such a linear mode displays superior picture quality and light efficiency as it does not generate a ripple in the current Io. It also advantageously achieves a fast transient phenomenon and fast switching. Meanwhile, the LED driver 200 has low power efficiency and large heat generation due to a voltage drop in the output transistor 264. For example, when the driving current is larger than 20 A, power loss of around 200 W may occur.

That is, the LED driver 200 consumes a lot of power due to low power efficiency, thereby putting too much burden on a power supply apparatus and requiring large design capacity. Also, the LED driver 200 requires a large-sized heat radiation plate for heat radiation, thereby increasing size and weight thereof and preventing a compact product design.

The LED driver 200 may also comprise a circuit configuration as shown in FIG. 4, and such a driving circuit may be referred to as a switch mode driving circuit. The LED driver 200 in switch mode typically comprises a current detector, an error amplifier 272, a PWM modulator 274, a gate circuit 276, a switch 278, an inductor 280, a diode 282 and a switch block 284.

The current detector and the error amplifier 272 of the LED driver 200 in the switch mode operate similar to the driving circuit in the linear mode in FIG. 3. The PWM modulator 274 compares an output of the error amplifier 272 and a triangular wave, and generates a pulse width modulation (PWM) signal. The gate circuit 276 drives the switch 278, which is preferably a metal-oxide semiconductor field effect transistor (MOSFET), by the pulse width modulation (PWM) signal. The inductor 280 integrates a square wave pulse output from the switch 278 and allows the LED modules 210 to be supplied with a direct current.

The switch mode LED driver 200 achieves more than 90% power efficiency and has fewer problems in power consumption and heat radiation than the linear mode driving circuit shown in FIG. 3. However, the picture quality thereof is not better than the linear type due to a ripple current caused by the switching, and it has a low light efficiency as a transient phenomenon is slow when switching from one LED module to another LED module.

Accordingly, there is a need for an improved LED driver having high power efficiency and light efficiency, while minimizing a ripple current to improve picture quality.

SUMMARY OF THE INVENTION

It is an aspect of the present invention to provide an LED driver having high power efficiency and light efficiency and minimal distortions of a driving current.

Additional aspects and/or advantages of the invention will be set forth in part in the description which follows and, in part, will be obvious from the description, or may be learned by practice of the invention.

The foregoing and/or other aspects of the present invention are achieved by providing an LED driver for driving light emitting diodes, comprising a linear mode driver to increase and decrease a linear mode current to make a current flowing in the LED achieve a predetermined target current value and output it to the LED; and a switch mode driver to increase and decrease a switch mode current depending on whether the linear mode current exceeds a predetermined reference current value and output it to the LED.

According to an aspect of the present invention, the linear mode driver comprises an error amplifier to output a signal corresponding to difference between a current value of the current flowing in the LED and the target current value; and an output transistor to increase or decrease the linear mode current corresponding to an output signal of the error amplifier and output it to the LED.

According to an aspect of the present invention, the switch mode driver comprises an inductor to integrate a square wave current by power supplied from a predetermined power source unit and change it into the switch mode current. A switch supplies or cuts off power of the power source unit to the inductor. A diode freewheels the current flowing in the inductor if the switch is turned off. A comparator compares the current value of the linear mode current and the reference current value and output a logical high signal or a logical low signal depending on whether the linear mode current exceeds the reference current value. A switch driver outputs a signal to open/close the switch according to the output signal of the comparator and drive the switch.

According to an aspect of the present invention, the LED driver further comprises a first current detector to detect the current flowing in the LED and supply the detected current to the linear mode driver.

According to an aspect of the present invention, the LED driver further comprises a second current detector to detect the linear mode current and supply the linear mode current to the switch mode driver.

According to an aspect of the present invention, the LED driver further comprises a switch block to supply or cut off the linear mode current and the switch mode current to each of the plurality of LEDs to make the linear mode current and the switch mode current to sequentially flow in the plurality of LEDs.

BRIEF DESCRIPTION OF THE DRAWINGS

The above and/or other aspects and advantages of the present invention will become apparent and more readily appreciated from the following description of the embodiments, taken in conjunction with the accompany drawings of which.

Throughout the drawings, it should be understood that like reference numbers are used to depict like elements, features and structures.

DETAILED DESCRIPTION OF EXEMPLARY EMBODIMENTS

Reference will now be made in detail to exemplary embodiments of the present invention, which are illustrated in the accompanying drawings. The exemplary embodiments described below are meant to provide a clear and concise understanding of the present invention, and are not meant to be limiting. Those of ordinary skill in the art will appreciate that various changes and modifications could be made to the embodiments described herein without departing from the scope and spirit of the present invention.

Figure 1:
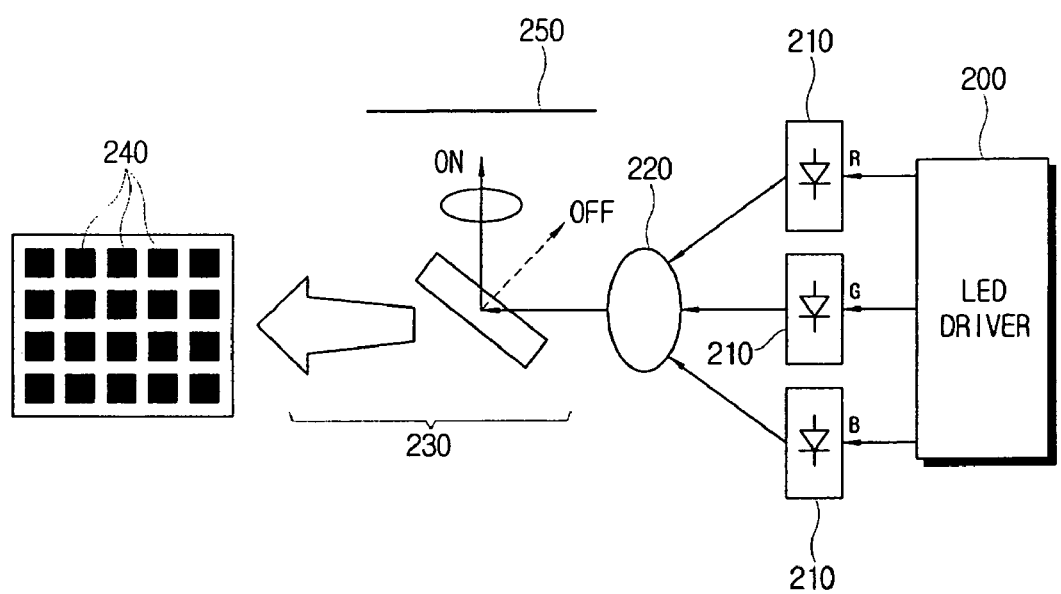
FIG. 1 illustrates a configuration of a conventional LED driving apparatus.
Figure 2:
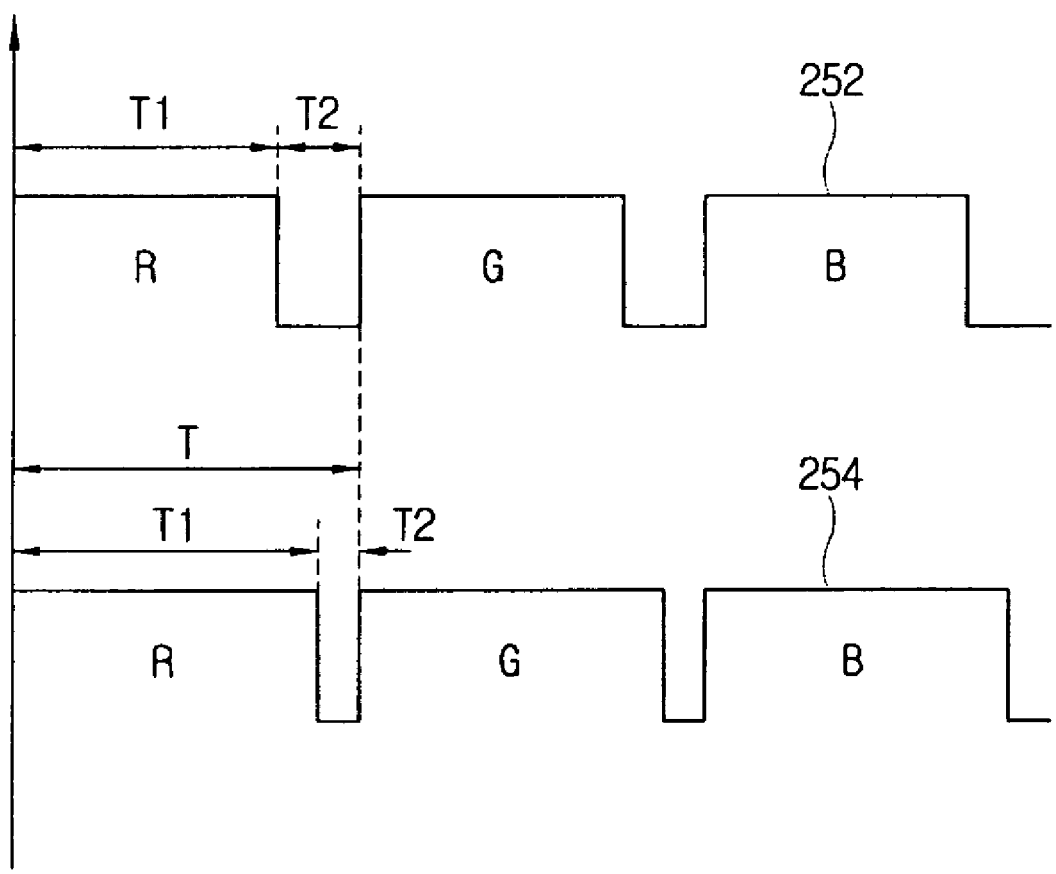
FIG. 2 illustrates a wave form by operation of a conventional DMD display apparatus.
Figure 3:
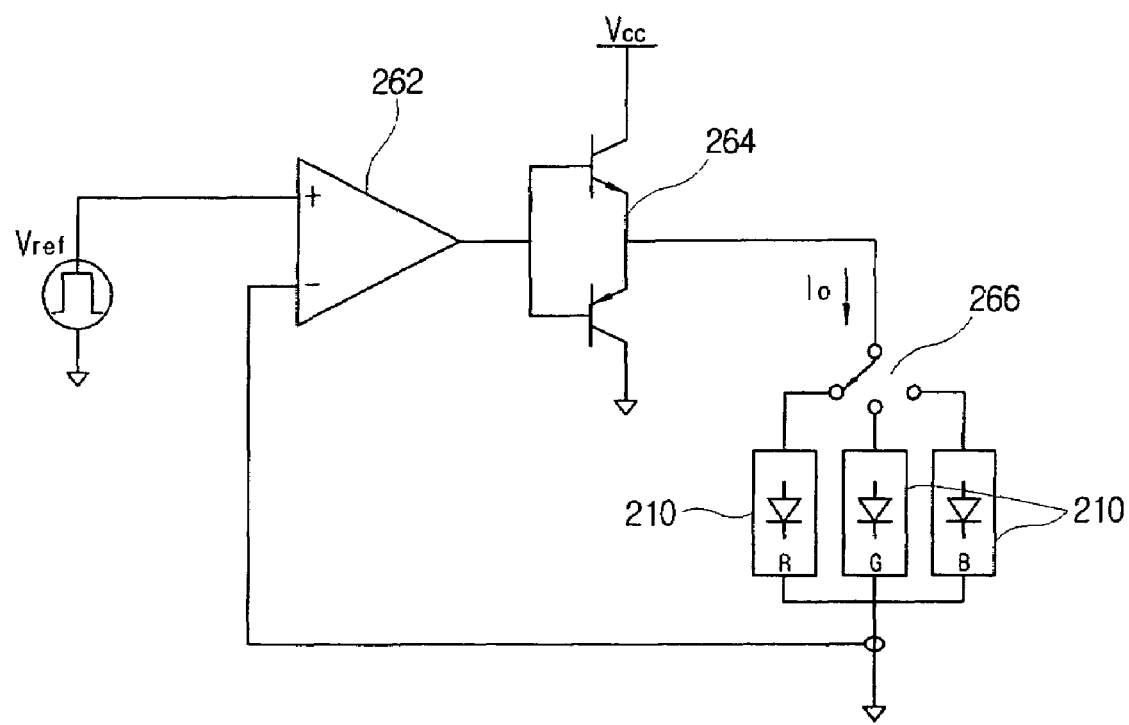
FIG. 3 illustrates a circuit configuration of a conventional LED driver in a linear mode.
Figure 4:
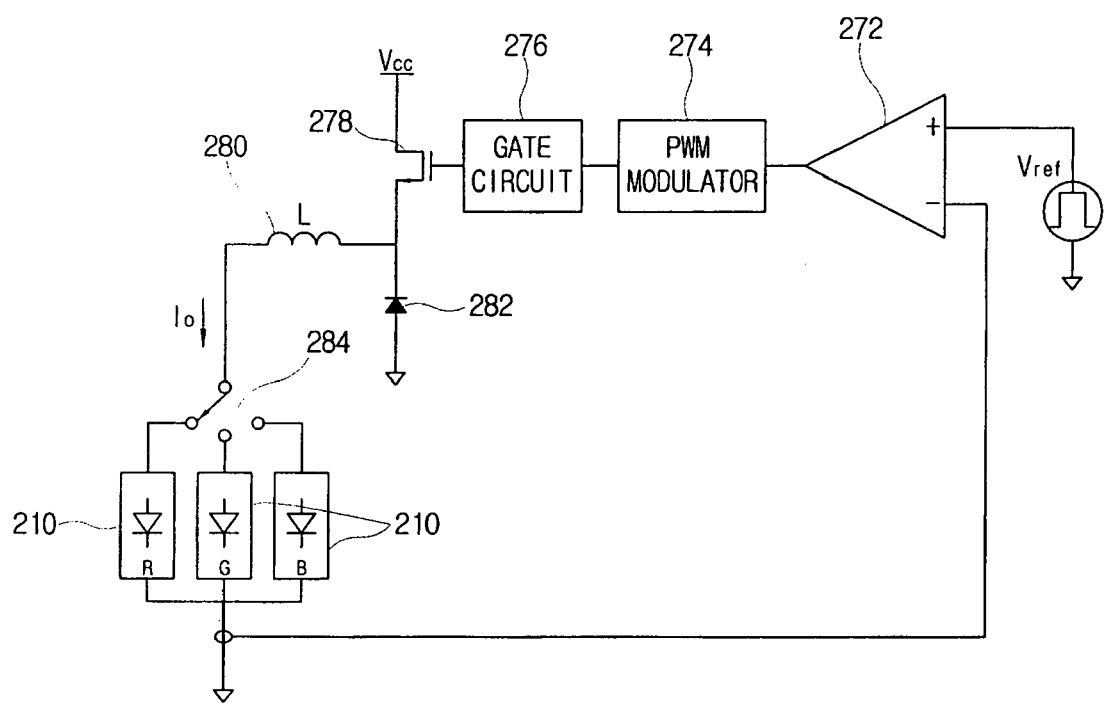
FIG. 4 illustrates a circuit configuration of a conventional LED driver in a switch mode.
Figure 5:
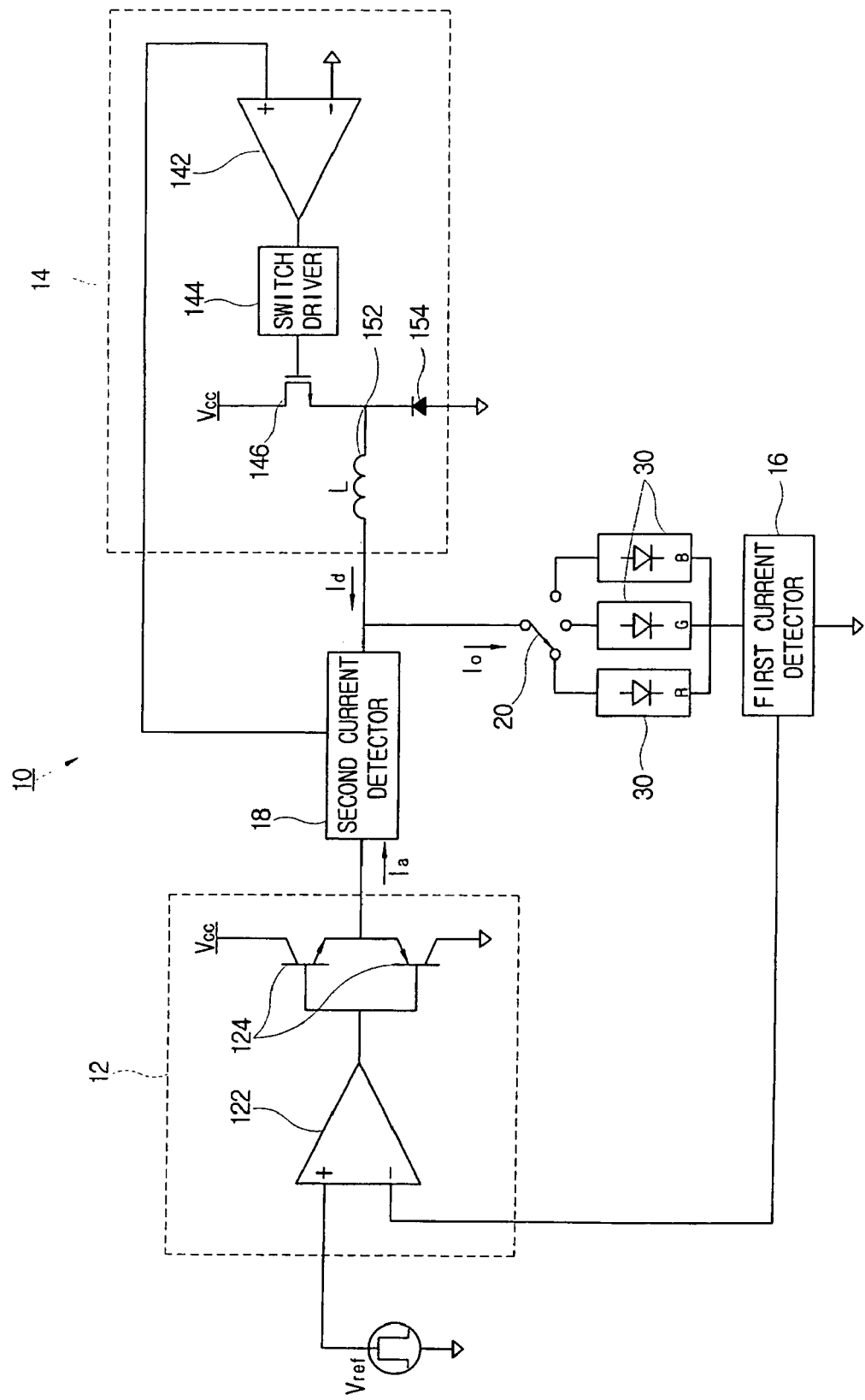
FIG. 5 illustrates a configuration of an LED driver according to an embodiment of the present invention.

FIG. 5 illustrates a configuration of an LED driver 10 according to an embodiment of the present invention.

The LED driver 10 shown in FIG. 5 drives an LED 30 used as a light source of a digital micromirror device (DMD) display apparatus such as a digital light processing (DLP) projection TV and a projector using a digital micromirror device, and an LCD back light.

As shown in FIG. 5, the LED driver 10 comprises a linear mode driver 12 and a switch mode driver 14. Each of output terminals of the linear mode driver 12 and the switch mode driver 14 are connected to an anode as an input terminal of the LED 30, and outputs a linear mode current Ia and a switch mode current Id to the anode of the LED 30. Accordingly, the current Io flowing through the LED 30 is equal to the sum of the linear mode current Ia and the switch mode current Id.

The linear mode driver 12 increases and decreases the linear mode current Ia to make the current flowing in the LED 30 reach a predetermined target current value. The linear mode driver 12 comprises an error amplifier 122 and an output transistor 124.

The error amplifier 122 comprises inverting and non-inverting input terminals and an output terminal thereof is connected to an input terminal of the output transistor 124. The error amplifier 122 outputs a signal corresponding to the difference between the current value and the target current value of the current Io flowing in the LED 30. As an example, the error amplifier 122 may be realized as an operational-amplifier.

The LED driver 10 comprises a first current detector 16 to detect the current Io flowing in the LED 30. A first end of the first current detector 16 is connected to a cathode as an output terminal of the LED 30 and a second terminal thereof is connected to the ground. The first current detector 16 detects the current Io flowing in the LED 30 and supplies a voltage corresponding to the current Io to the error amplifier 122.

The error amplifier 122 receives the voltage corresponding to the current Io flowing in the LED 30 from the first current detector 16 at an inverting input terminal, and a predetermined reference voltage Vref corresponding to the target current value at a non-inverting input terminal. Here, the target current value refers to a magnitude of current to be supplied to the LED 30. The error amplifier 122 amplifies the voltage difference between the voltage corresponding to the current Io flowing in the LED 30 and the target voltage Vref and outputs it as an output signal.

The output transistor 124 increases or decreases the linear mode current Ia corresponding to the output signal of the error amplifier 122 to output it to the LED 30. The output transistor 124 preferably comprises two bipolar junction transistors of different types in the form of a push-pull. As bases of the two transistors are connected to each other, the output transistor 124 is connected with the output terminal of the error amplifier 122. Also, emitters of the two transistors are connected each other, and output the linear mode current Ia at an output terminal of the linear mode driver 12. A collector of an NPN type transistor is connected to a predetermined power source unit and receives a power voltage Vcc from the power source unit. The collector of the PNP type transistor is connected to ground.

The output transistor 124 operates to make the linear mode current Ia increase or decrease corresponding to the output signal of the error amplifier 122. Accordingly, the linear mode driver 12 outputs the linear mode current Ia so that the current Io flowing in the LED 30 reaches the target current value. If a difference occurs between the current value of the current Io flowing in the LED 30 and the target current value due to adding another predetermined current to the linear mode current Ia, a current corresponding to the difference is added or reduced from the linear mode current Ia, thereby continuously adjusting the linear mode current Ia to make the current Io flowing in the LED 30 to reach the target current value.

The switch mode driver 14 increases and decreases the switch mode current Id depending on whether the linear mode current Ia exceeds the predetermined reference current value, and outputs the switch mode current Id to the LED 30. As shown in FIG. 5, the switch mode driver 14 comprises an inductor 152, a diode 154, a switch 146, a comparator 142 and a switch driver 144. Meanwhile, the switch mode driver 14 may further comprise a second current detector 18 to detect the linear mode current Ia and supply it to the switch driver 144.

A first end of the inductor 152 is connected to a first end of the switch 146 and a cathode of the diode 154, and a second end thereof is connected to the LED 30. The current flowing in the inductor 152 is the switch mode current Id. An anode of the diode 154 is connected to ground. The inductor 152 integrates a square wave current by power supplied from the predetermined power source unit to convert the square wave current into the switch mode current Id.

The switch 146 is preferably realized as a metal-oxide semiconductor field effect transistor (MOSFET), and the gate of the switch 146 is connected to an output terminal of the switch driver 144. A drain of the switch 146 is connected to the predetermined power source unit and receives a power voltage Vcc. Also, a source of the switch 146 is connected to the first end of the inductor 152 and the cathode of the diode 154.

The switch 146 performs a switching operation by being turned on and off according to the logic state of a gate voltage received at the gate. If the switch 146 is turned on, a current flows between the drain and the source and the power voltage Vcc is applied to the inductor 152. Current flowing in the inductor 152 increases over time until it is charged to a predetermined level, and the switch mode current Id is increased. Conversely, if the switch 146 is turned off, the current flow is blocked between the drain and the source. The current charged in the inductor 152 continues to flow through the diode 154 and into the LED 30. Over time, the switch mode current Id decreases since the power supply is cut off.

The comparator 142 compares the current value and the reference current value of the linear mode current Ia, and outputs a logical high or low signal depending on whether the linear mode current Ia exceeds the reference current value. According to one embodiment of the present invention, the comparator 142 is realized as an operational-amplifier.

A non-inverting input terminal of the comparator 142 is connected to an output terminal of the second current detector 18. The non-inverting input terminal of the comparator 142 is applied with a voltage corresponding to the linear mode current Ia, and the inverting input terminal of the comparator 142 is connected to ground. That is, the reference current value is zero in the exemplary embodiment, and the voltage corresponding thereto is zero (ground potential). If the voltage corresponding to the linear mode current Ia is larger than zero, the comparator 142 outputs the logical high signal. If not, the comparator 142 outputs the logical low signal.

The switch driver 144 outputs a signal to open and close the switch 146 according to the output signal of the comparator 142 and drives the switch 146. The switch driver 144 generates a gate voltage appropriate for the switch 146 to be turned on and off depending on whether the output signal of the comparator 142 is the logical high or low signal, and applies the gate voltage to the gate of the switch 146.

That is, the switch driver 144 turns on switch 146 to start outputting the switch mode current Id and continuously increasing it if the linear mode current Ia is larger than the predetermined reference current value zero. If the linear mode current Ia reaches the reference current value zero, the switch driver 144 decreases the switch mode current Id.

Figure 6:
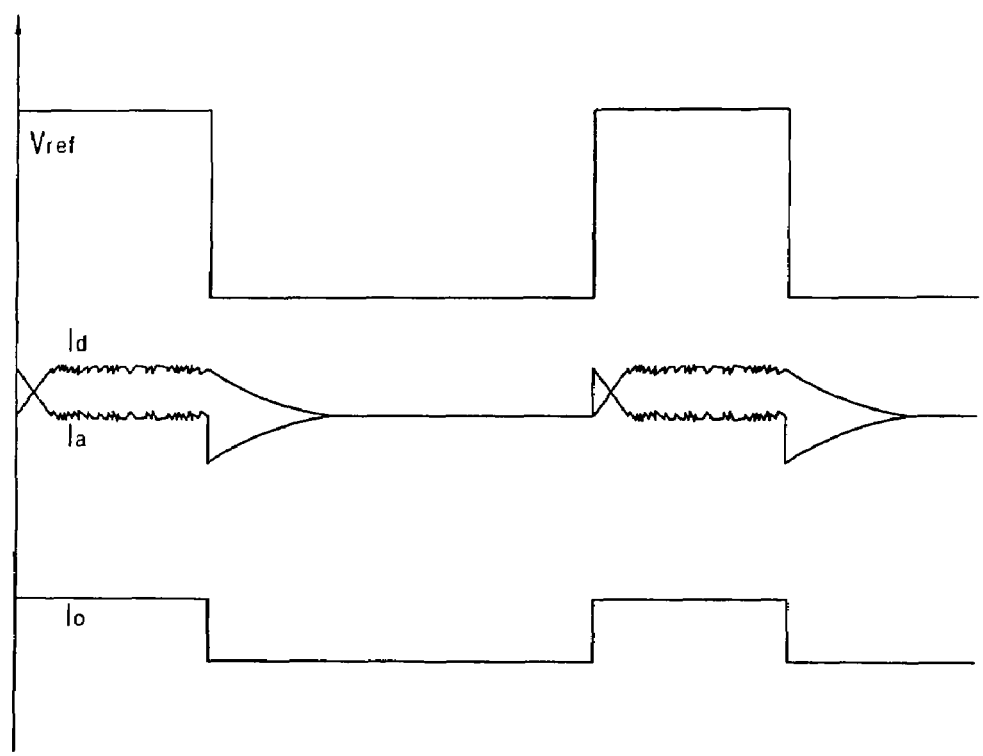
FIG. 6 illustrates a target voltage and wave forms of currents in the LED driver shown in FIG. 5.

FIG. 6 illustrates a wave form of respective currents according to operation of the LED driver 10. As shown therein, supposing that the current Io flowing initially in the LED 30 is 0, the linear mode driver 12 outputs the linear mode current Ia having the size of the target current value as the voltage corresponding to the current Io flowing in the LED 30 is zero and the target voltage Vref corresponding to the target current value becomes a predetermined size larger than zero.

Meanwhile, the switch mode driver 14 starts outputting the switch mode current Id as the linear mode current Ia is larger than the reference current value zero. The linear mode driver 12 decreases the linear mode current Ia to be smaller than the target current value corresponding to the switch mode current Id as the current Io flowing in the LED 30 is larger than the target current value corresponding to the switch mode current Id. As the linear mode current Ia is still larger than the reference current value zero, the switch mode driver 14 continues to increase the switch mode current Id.

As described above, the linear mode driver 12 continuously decreases the linear mode current Ia, and the switch mode driver 14 continuously increases the switch mode current Id.

The switch mode driver 14 decreases the switch mode current Id as the linear mode current Ia becomes zero without exceeding the reference current value. Then, the linear mode driver 12 outputs the linear mode current Ia corresponding to a difference between the target current value and the switch mode current Id as the current Io flowing in the LED 30 is the switch mode current Id and it is smaller than the target current value. The switch mode driver 14 increases the switch mode current Id and outputs it as the linear mode current Ia is larger than the reference current value zero.

That is, the LED driver 10 operates to make the linear mode current Ia to be increased/decreased to a predetermined size in a ripple form around the reference current value, and make the switch mode current Id to be increased/decreased to a predetermined size in a ripple form around the target current value. Each of the ripples of the linear mode current Ia and the switch mode current Id is mutually supportive. Thus, the current Io flowing in the LED 30 as the sum of the linear mode current Ia and the switch mode current Id is in the shape of a square wave and almost flat around the target current value.

In the LED driver 10, the distortion of the driving current is improved as the ripple is removed by the switching of the switch mode circuit. Also, in the LED driver 10, light efficiency is enhanced and the picture quality is improved thanks to the fast dynamic characteristic of the linear mode circuit. The linear mode current Ia remains around the reference current value zero and most of the current is the switch mode current Id while the current Io flowing in the LED 30 maintains the target current value, thereby minimizing power consumption of the linear mode driver 12 having low power efficiency and maximizing power efficiency through the switch mode driver 14 having high power efficiency.

The LED driver 10 according to embodiments of the present invention may sequentially drive the plurality of LEDs 30. The LED driver 10 drives three LED modules 30 formed as a plurality of LEDs corresponding to the respective colors of red, green and blue (RGB). The LED driver 10 may further comprise a switch block 20 for supplying or cutting off the linear mode current Ia and the switch mode current Id to each of the three LED modules 30 to make the linear mode current Ia and the switch mode current Id sequentially flow to the respective three LED modules 30.

The switch block 20 preferably comprises three diversion switches and a diversion switch driver to drive the diversion switches. The switch block 20 sequentially opens and closes the three diversion switches as the target current value changes corresponding to the respective colors of red, green and blue.

As shown in FIG. 6, if the target current value changes, the target voltage Vref corresponding thereto forms a range with zero for a predetermined time. If the target voltage Vref changes from a predetermined target level to zero, the linear mode current Ia and the switch mode current Id have a predetermined transient range until reaching zero. If the target voltage Vref changes from zero to the predetermined target level; the linear mode current Ia and the switch mode current Id form the ripple around the reference current value and the target current value, and have the predetermined transient range until being stable.

As the linear mode current Ia and the switch mode current Id are mutually supportive even in the transient range, the current Io flowing in the LED 30 is in the square wave shape and substantially flat around the reference current value and the target current value.

Accordingly, the LED driver 10 according to an embodiment of the inventions advantageously removes a transient response due to the switching, thereby minimizing a disuse range in which the DMD does not operate and improving light efficiency.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A LED driver for driving a light emitting diode, comprising:
    a linear mode driver to increase and decrease a linear mode current to make a current flow in the LED at a predetermined target current value and output it to the LED; and
    a switch mode driver to increase and decrease a switch mode current depending on whether the linear mode current exceeds a predetermined reference current value and output it to the LED, wherein the current flowing through the LED is equal to the sum of the linear mode current and the switch mode current.

2. The LED driver according to claim 1, wherein the linear mode driver comprises an error amplifier to output a signal corresponding to difference between a current value of the current flowing in the LED and the target current value; and an output transistor to increase or decrease the linear mode current corresponding to an output signal of the error amplifier and output it to the LED.

3. The LED driver according to claim 1, wherein the switch mode driver comprises an inductor to integrate a square wave current by power supplied from a predetermined power source unit and convert it into the switch mode current; a switch to supply or cut off power of the power source unit to the inductor; a diode to freewheel the current flowing in the inductor if the switch is turned off; a comparator to compare the current value of the linear mode current and the reference current value and output a logical high signal or a logical low signal depending on whether the linear mode current exceeds the reference current value; and a switch driver to output a signal opening/closing the switch according to the output signal of the comparator and drive the switch.

4. The LED driver according to claim 1, further comprising a first current detector to detect the current flowing in the LED and supply the detected current to the linear mode driver.

5. The LED driver according to claim 1, further comprising a second current detector to detect the linear mode current and supply the linear mode current to the switch mode driver.

6. The LED driver according to claim 1, further comprising a switch block to supply or cut off the linear mode current and the switch mode current to each of the plurality of LEDs to make the linear mode current and the switch mode current to sequentially flow in the plurality of LEDs.

7. A method of driving an LED unit, comprising the steps of:
    increasing or decreasing a linear mode current to make a current flow in the LED unit at a predetermined target current value; and
    increasing or decreasing a switch mode current depending on whether the linear mode current exceeds a predetermined reference current value, wherein the current flowing through the LED is equal to the sum of the linear mode current and the switch mode current.

8. The method of claim 7, wherein the step of increasing or decreasing the linear mode current comprises increasing or decreasing the linear mode current based on a difference between a current flowing in the LED unit and a target current value.

9. The method of claim 8, wherein the difference is measured using an error amplifier.

10. The method of claim 7, further comprising the steps of converting a square wave current into a direct current; and comparing the linear mode current and the reference current and increasing or decreasing the switch mode current based on whether the linear mode current is greater than or less than the reference current.

11. The method of claim 10, wherein the converting step comprises charging an inductor by applying a source voltage to the inductor, and discharging the inductor by removing the source voltage from the inductor.

12. The method of claim 11, wherein the converting step further comprises allowing current to flow through a flywheel diode into the inductor, when the source voltage is removed from the inductor.

* * * * *